(12) United States Patent
Holtz et al.

(10) Patent No.: US 9,741,129 B2
(45) Date of Patent: Aug. 22, 2017

(54) TECHNIQUE FOR AUTOMATICALLY TRACKING AN OBJECT BY A CAMERA BASED ON IDENTIFICATION OF AN OBJECT

(75) Inventors: Alex Holtz, Jacksonville, FL (US); Scott Raymond Matics, Jacksonville, FL (US); Lionel Oisel, La Nouaye (FR)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 451 days.

(21) Appl. No.: 12/736,227

(22) PCT Filed: Apr. 13, 2009

(86) PCT No.: PCT/US2009/002286
§ 371 (c)(1),
(2), (4) Date: Sep. 20, 2010

(87) PCT Pub. No.: WO2009/128884
PCT Pub. Date: Oct. 22, 2009

(65) Prior Publication Data
US 2011/0007158 A1    Jan. 13, 2011

Related U.S. Application Data

(60) Provisional application No. 61/124,094, filed on Apr. 14, 2008.

(51) Int. Cl.
*H04N 7/18*    (2006.01)
*G06T 7/20*    (2017.01)
(Continued)

(52) U.S. Cl.
CPC .............. *G06T 7/20* (2013.01); *G01S 3/7865* (2013.01); *H04N 5/23203* (2013.01);
(Continued)

(58) Field of Classification Search
CPC ....... G01S 3/7865; G06T 7/20; G06T 7/2046; H04N 5/23216; H04N 5/23248;
(Continued)

(56) References Cited

U.S. PATENT DOCUMENTS 5,164,992 A * 11/1992 Turk et al. .................... 382/118
5,469,188 A * 11/1995 Krishnamurthy et al. ... 345/618
(Continued)

FOREIGN PATENT DOCUMENTS

EP    1739966    1/2007
GB    2429867 A    3/2007
(Continued)

OTHER PUBLICATIONS

Xu:"A Portable and Low-Cost E-Learning Video Capture System," School of information Technology, Charles Sturt University, ACIVS 2006, LNCS 4179, pp. 1088-1098, 2006.
(Continued)

*Primary Examiner* — Daniel C. Murray
(74) *Attorney, Agent, or Firm* — Arent Fox LLP

(57) ABSTRACT

Automatic tracking by a camera (16) of an object (12) such as on-air talent appearing in a television show commences by first determining whether the object lies within the camera field of view matches a reference object. If so, tracking of the object then occurs to maintain the object in fixed relationship to a pre-set location in the camera's field of view, provided the designated object has moved more than a threshold distance from the pre-set location.

20 Claims, 4 Drawing Sheets

(51) Int. Cl.
*G01S 3/786* (2006.01)
*H04N 5/232* (2006.01)

(52) U.S. Cl.
CPC .............. *H04N 5/23216* (2013.01); *G06T 2207/10016* (2013.01); *G06T 2207/30201* (2013.01)

(58) Field of Classification Search
CPC .... H04N 5/23203; H04N 5/144; H04N 5/232; H04N 5/23296; H04N 7/188; G08B 13/19608; G08B 13/196606
USPC ........................................................ 348/143
See application file for complete search history.

(56) References Cited

U.S. PATENT DOCUMENTS

| | | | | |
|---|---|---|---|---|
| 5,583,565 A | * | 12/1996 | Cortjens et al. | 348/14.1 |
| 5,587,929 A | * | 12/1996 | League et al. | 342/159 |
| 5,631,697 A | * | 5/1997 | Nishimura et al. | 348/172 |
| 5,668,629 A | | 9/1997 | Parker et al. | |
| 5,696,684 A | * | 12/1997 | Ueberschaer | 701/455 |
| 5,734,948 A | * | 3/1998 | Nagayama et al. | 399/46 |
| 5,835,616 A | * | 11/1998 | Lobo et al. | 382/118 |
| 5,850,470 A | * | 12/1998 | Kung et al. | 382/157 |
| 5,982,909 A | * | 11/1999 | Erdem et al. | 382/103 |
| 6,198,693 B1 | * | 3/2001 | Marash | 367/125 |
| 6,400,996 B1 | | 6/2002 | Hoffberg et al. | 700/83 |
| 6,463,163 B1 | * | 10/2002 | Kresch | 382/103 |
| 6,490,322 B2 | | 12/2002 | Needham et al. | 375/240.16 |
| 6,567,116 B1 | * | 5/2003 | Aman et al. | 348/169 |
| 6,661,907 B2 | * | 12/2003 | Ho et al. | 382/118 |
| 6,680,745 B2 | * | 1/2004 | Center et al. | 348/14.16 |
| 6,687,386 B1 | * | 2/2004 | Ito et al. | 382/103 |
| 6,707,489 B1 | * | 3/2004 | Maeng et al. | 348/211.12 |
| 6,727,935 B1 | * | 4/2004 | Allen et al. | 348/14.03 |
| 6,727,938 B1 | * | 4/2004 | Randall | 348/143 |
| 6,731,334 B1 | * | 5/2004 | Maeng et al. | 348/211.12 |
| 6,744,049 B2 | | 6/2004 | Galloway | 250/338.3 |
| 6,771,306 B2 | * | 8/2004 | Trajkovic et al. | 348/170 |
| 6,792,135 B1 | * | 9/2004 | Toyama | 382/118 |
| 6,804,391 B1 | * | 10/2004 | Blake et al. | 382/159 |
| 6,809,760 B1 | * | 10/2004 | Takagi et al. | 348/211.9 |
| 6,826,284 B1 | * | 11/2004 | Benesty et al. | 381/92 |
| 6,867,799 B2 | * | 3/2005 | Broemmelsiek | 348/169 |
| 6,901,206 B2 | * | 5/2005 | DaSilva | 386/239 |
| 6,914,622 B1 | * | 7/2005 | Smith et al. | 348/14.05 |
| 6,917,719 B2 | * | 7/2005 | Krishnamurthy et al. | 382/282 |
| 6,922,206 B2 | * | 7/2005 | Chu et al. | 348/14.09 |
| 6,940,540 B2 | * | 9/2005 | Beal et al. | 348/169 |
| 6,947,073 B1 | * | 9/2005 | Seal | 348/169 |
| 6,970,796 B2 | * | 11/2005 | Tashev | 702/94 |
| 7,161,615 B2 | * | 1/2007 | Pretzer et al. | 348/143 |
| 7,307,652 B2 | * | 12/2007 | Broemmelsiek | 348/169 |
| 7,355,627 B2 | * | 4/2008 | Yamazaki et al. | 348/143 |
| 7,440,594 B2 | * | 10/2008 | Takenaka | 382/118 |
| 7,546,027 B2 | * | 6/2009 | Moriya | 396/55 |
| 7,806,604 B2 | * | 10/2010 | Bazakos et al. | 396/427 |
| 8,179,602 B2 | * | 5/2012 | Ota | 359/557 |
| 2001/0035907 A1 | * | 11/2001 | Broemmelsiek | 348/169 |
| 2002/0008202 A1 | * | 1/2002 | Galloway | 250/338.3 |
| 2002/0008758 A1 | * | 1/2002 | Broemmelsiek et al. | 348/143 |
| 2002/0018124 A1 | * | 2/2002 | Mottur et al. | 348/211 |
| 2002/0030741 A1 | * | 3/2002 | Broemmelsiek | 348/169 |
| 2002/0113862 A1 | * | 8/2002 | Center et al. | 348/14.08 |
| 2002/0113903 A1 | * | 8/2002 | Needham et al. | 348/702 |
| 2002/0140813 A1 | | 10/2002 | Trajkovic et al. | 348/170 |
| 2003/0103055 A1 | * | 6/2003 | DaSilva | 345/536 |
| 2003/0103139 A1 | * | 6/2003 | Pretzer et al. | 348/143 |
| 2003/0142209 A1 | * | 7/2003 | Yamazaki et al. | 348/143 |
| 2004/0032494 A1 | * | 2/2004 | Ito et al. | 348/152 |
| 2004/0201674 A1 | * | 10/2004 | Miyazaki et al. | 348/148 |
| 2006/0244866 A1 | * | 11/2006 | Kishida | 348/699 |
| 2007/0092245 A1 | * | 4/2007 | Bazakos et al. | 396/427 |
| 2007/0165129 A1 | * | 7/2007 | Hill et al. | 348/335 |
| 2007/0291104 A1 | * | 12/2007 | Petersen et al. | 348/14.01 |
| 2008/0158361 A1 | * | 7/2008 | Itoh et al. | 348/155 |
| 2008/0231709 A1 | * | 9/2008 | Brown et al. | 348/169 |

FOREIGN PATENT DOCUMENTS

| | | | | |
|---|---|---|---|---|
| JP | 2001076156 A | | 3/2001 | |
| JP | 2004354420 A | | 12/2004 | |
| KR | 20040039080 | | 5/2004 | |
| KR | 100660725 | | 12/2006 | |
| WO | WO2007097586 | | 8/2007 | |
| WO | WO/2009/034047 A1 | * | 3/2009 | ............... G06T 7/20 |

OTHER PUBLICATIONS

Huang et al.:"Simple and Effective Algorithm for Automatic Tracking of a Single Object Using a Pan-Tilt-Zoom Camera," IEEE, pp. 789-792, 2002.

Xu, Richard Y.D.: "A Portable and Low-Cost E-Learning Video Capture System", Advanced Concepts for Intelligent Vision Systems Lecture Notes in Compter Science; LNCS, Springer, Berlin, DE. vol. 4179, Jan. 1, 2006 (Jan. 1, 2006), pp. 1088-1098.

Huang, Yu-Wen et al: Simple and Effective Algorithm for Automatic Tracking of a Single Object Using a Pan-Tilt-Zoom Camera, pp. 789-792, 2002.

Search Report Dated Aug. 10, 2009.

Office Action in Chinese Application No. 200980113251.8 mailed May 25, 2008.

EPO Communication Application No. 09 733 619.2-1906 mailed Apr. 4, 2013.

Richard Y D XU ED; Jacques Blanc-Talon et al, "A Portable and Low-Cost E-Learning Video Capture System", Advanced Concepts for Intelligent Vision Systems Lecture Notes in Computer Science; LNCS, Springer, Berlin, DE vol. 4179, Jan. 1, 2006, p. 1088-1098, XP01043429, ISBN: 978-3-540-44630-9.

Notification of Reasons for Refusal dated Jul. 16, 2013 regarding Japan Patent Application No. 2011-505003.

IPRP and Written Opinion dated Oct. 19, 2010 regarding PCT/US2009/002286.

EP Communication dated Apr. 22, 2014 regarding EP Application No. 09733619.2.

\* cited by examiner

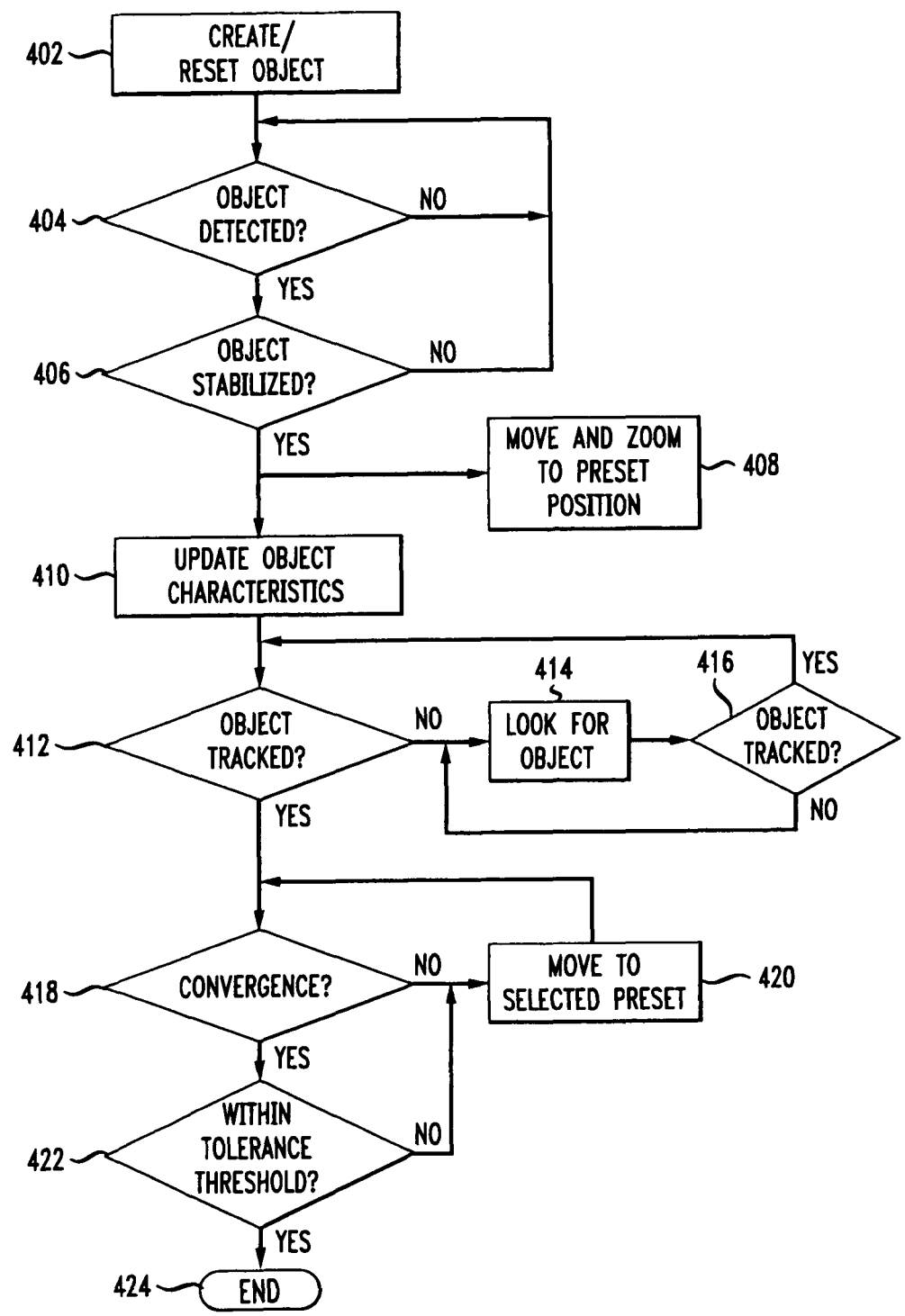

TECHNIQUE FOR AUTOMATICALLY TRACKING AN OBJECT BY A CAMERA BASED ON IDENTIFICATION OF AN OBJECT

CROSS REFERENCE INFORMATION

This application claims the benefit, under 35 U.S.C. §365 of International Application PCT/US2009/002286, filed Apr. 13, 2009, which was published in accordance with PCT Article 21(2) on Oct. 22, 2009 in English and which claims priority under 35 U.S.C. 119(e) to U.S. Provisional Patent Application Ser. No. 61/124,094 filed Apr. 14, 2008, the teachings of which are incorporated herein.

TECHNICAL FIELD

This invention relates to a technique for tracking an object whose image is captured by a camera or the like.

BACKGROUND ART

Live production of a television program such as a news show often requires one or more television cameras to capture the image of different "on-air" talent, such as a news anchor, weather reporter and/or sports reporter. In the past, a camera operator would manually operate each television camera. Such manual operation often entailed moving the camera to different positions within a television studio to make sure that the particular on-air talent appeared in the center of the camera's field of view. During broadcasting, the on-air talent often will make slight lateral movements, forcing the camera operator to displace the camera by a corresponding amount to maintain the on-air talent within the center of the camera's field of view. The camera operator will generally observe the image of the on-air talent in the camera's view finder so the operator will have immediate knowledge of the movement of the talent and move the camera accordingly.

Advances in technology have led to the development of robotic television cameras, such as the "Cameraman", available from Thomson Grass Valley, Jacksonville, Fla. Such robotic cameras operate under the control of one or more computers which manage functions such as camera displacement along the x, y, and z axes, pan, tilt, zoom and focus. By appropriately programming the computer(s), the camera will operate automatically, thus obviating the need for manual control. Typical robotic cameras have the ability to move from a known home position to one or more pre-set positions, each pre-set position enabling a particular camera shot of an on-air talent. Generally, the pre-set camera positions remain static. In other words, if the on-air talent moves even slightly to the right or left while the robotic camera remains static, then the on-air talent will appear off-center within the field of view of the camera.

To overcome this difficulty, robotic cameras can include automatic tracking technology such as such the tracking system described in U.S. Pat. No. 5,668,629 issued in the name of Jeffrey Parker et al. The automatic tracking system described in the '629 patent employs a Infra-Red (BR) transmitter carried by the moving object (e.g., the on-air talent) for transmitting signals to an IR receiver carried by the robotic camera. By detecting the deviation in the signal transmitted by the transmitter as it moves with the object, the IR receiver can establish the new position of the moving object and provide that information to the computer(s) controlling the robotic camera to displace the camera accordingly.

The IR tracking technology described in the '629 patent works well for tracking a single moving object. However, tracking of multiple objects can prove problematic, such as in the case when a single robotic camera serves to capture the image of several different on-air talent, as occurs when the camera moves to capture the image of a news anchor at one instant, and a weather reporter at a different instant. Each different on-air talent would need to carry a separate IR transmitter to avoid interference, thus necessitating the need for multiple IR receivers on the camera. This IR system also suffers from the disadvantage that the anchor person has to wear an embedded system that should be located at the center of the head to have an accurate estimate of the head position Thus, a need exists for a tracking technique that overcomes the aforementioned disadvantage of the prior art.

BRIEF SUMMARY OF THE INVENTION

Briefly, in accordance with a preferred embodiment, there is provided a method for tracking an object within the field of view of a robotically controlled camera. The method commences by first determining whether the object lying within the camera field of view matches a reference object. If so, tracking of the object commences to maintain the object in fixed relationship to a pre-set location in the camera's field of view, provided the designated object has moved more than a threshold distance from the pre-set location. In this way, tracking occurs in accordance with the camera's field of view, and does not depend on any apparatus worn by the object being tracked.

BRIEF DESCRIPTION OF THE DRAWINGS

FIG. 4 depicts in flow chart form the steps of a method practiced by the apparatus of FIG. 1 for performing automatic tracking technique of the present principles.

DETAILED DESCRIPTION

Figure 1:
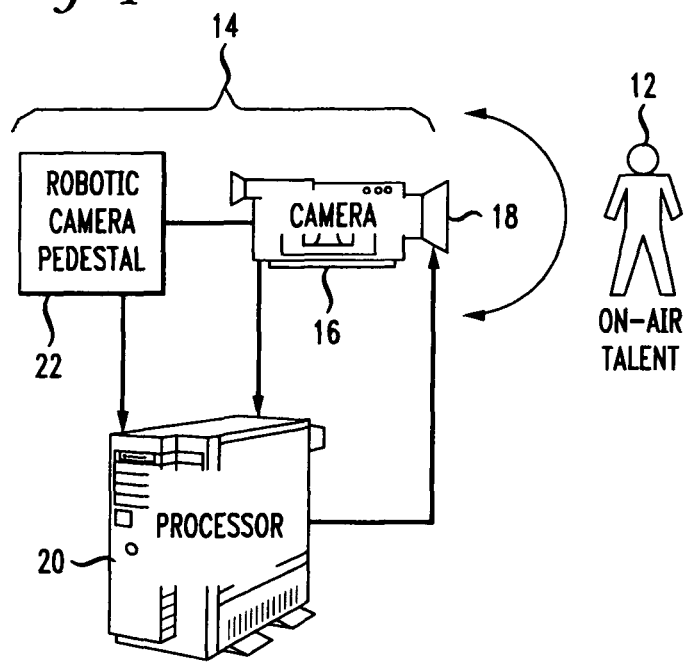
FIG. 1 depicts a block schematic diagram of an exemplary system for practicing the automatic tracking technique of the present principles.

FIG. 1 depicts a block schematic diagram of an exemplary system 10 for automatically tracking an object 12, such as on-air talent, in accordance with the present principles. The on-air talent 12 could take the form of a newscaster, sports reporter, or weatherman in connection with a production of a television news program, or on-air talent in connection with other types of television programming (e.g., a game show host).

The system 10 includes a robotic camera assembly 14, such as the "Camerman" robotic camera assembly available from Thomson Grass Valley, Jacksonville, Fla. The robotic camera assembly 14 typically includes a television camera 16 that carries a zoom lens 18 whose functions, such as iris and zoom, respond to signals supplied by a processor 20, such as but not limited to, a personal computer or the like. Thus, the lens 18 has a variable zoom function. The processor 20 also controls a robotic camera pedestal 22 which has the capability of displacing the camera 16 along the x, and y axes as well as panning and tilting the camera responsive to signals from the processor. The processor 20 operates to control the movement of the robotic camera pedestal 22 as well as the functions of the lens 18 in accordance with the video signal from the camera 16. Although the robotic camera system 14 depicts a single camera 16, the system could include multiple cameras controlled by a single processor or by individual processors.

Figure 2:
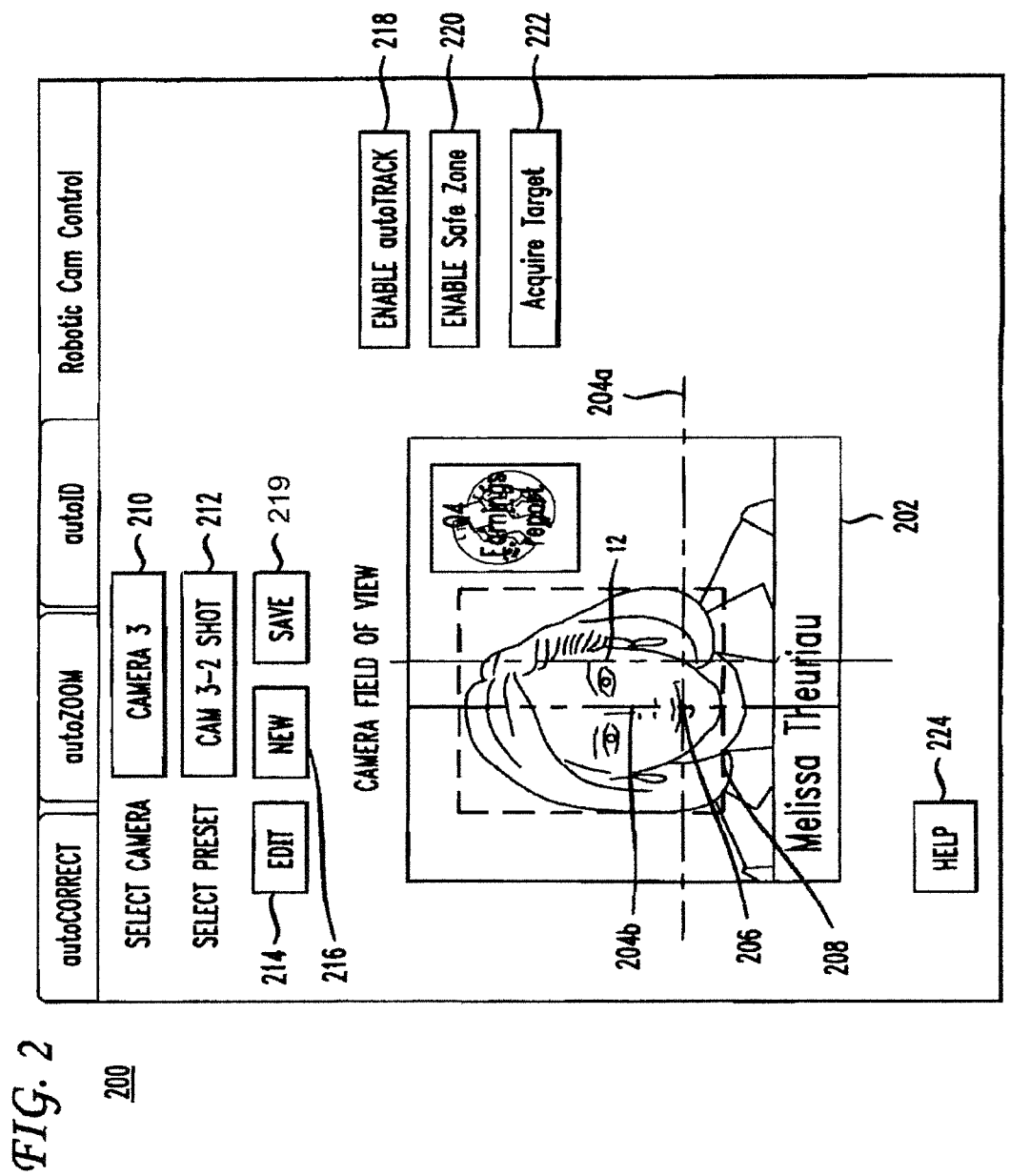
FIG. 2 depicts a Graphical User Interface (GUI) through which an operator can control the system of FIG. 1

FIG. 2 depicts a display of a Graphical User Interface (GUI) 200 via which an operator enters data to, and receives information from, a program executed by the processor 20 to carry out automatic tracking of an object (e.g., the on-air talent 12 of FIG. 1) in the manner described hereinafter. The GUI 200 of FIG. 2 includes a video screen 202 which displays the image of a selected television camera, such as the camera 16 of FIG. 1. The image displayed in the video screen 202 includes horizontal and vertical lines 204a and 204b, whose intersection 206 represent an offset associated with the tracking technique of the present principles. The offset constitutes the difference in position between the center of the object (e.g., the on-air talent 12 of FIG. 1) and the intersection 206 of the lines 204a and 204b. An operator can manipulate the location of the lines 204a and 204b by touching and dragging the lines to manipulate the offset. The video screen 202 also displays a "safe zone box", in the form of a border 208 which defines the region within which automatic tracking occurs. No tracking occurs for any object appearing outside the border 208. Thus, if the on-air 12 of FIG. 1 appears outside of the border 208, the camera 16 will not respond to movement of the on-air talent.

In addition to the video screen 202, the GUI 200 includes a plurality of "toggle buttons" 210-224, each taking the form of a particular region within the GUI, which when activated, triggers a particular action as described hereinafter. In practice, actuation of a particular one of the toggle buttons 210-224 can occur by the use of a computer mouse (not shown). Alternatively, the GUI 200 could undergo display on a touch screen so that touching the particular toggle button would trigger the corresponding action associated with that button. The toggle button 210 triggers selection of a particular one of several cameras, whereas the toggle button 212 selects a preset shot for the camera selected by the toggle button 210. Toggle button 214 triggers an edit capability to allow the operator to adjust various parameters, including but not limited to the speed of camera movement. In this way, the operator can adjust the sensitivity of the automatic tracking. Toggle button 216 triggers a new tracking session. Toggle button 219 triggers a save of the various settings and other information associated with a current tracking session, including but not limited to related safe zone settings for particular preset camera locations. Toggle button 218 enables automatic tracking of an object (e.g., the on-air talent 12 of FIG. 1) in accordance with the method of the present principles. Toggle button 240 enables creation of a safe zone defined by the border 208 to define a region outside of which no tracking will occur. Toggle button 222, when actuated, initiates automatic tracking, by entering into an "auto find" mode, whereupon the processor 20 of FIG. 1 will search the currently selected camera's field of view for a suitable object to begin tracking. Toggle button 222 automatically enables both automatic tracking and the Safe Zone without operator intervention. Lastly, toggle button 224, when actuated, triggers a help screen to assist the operator.

Figure 3:
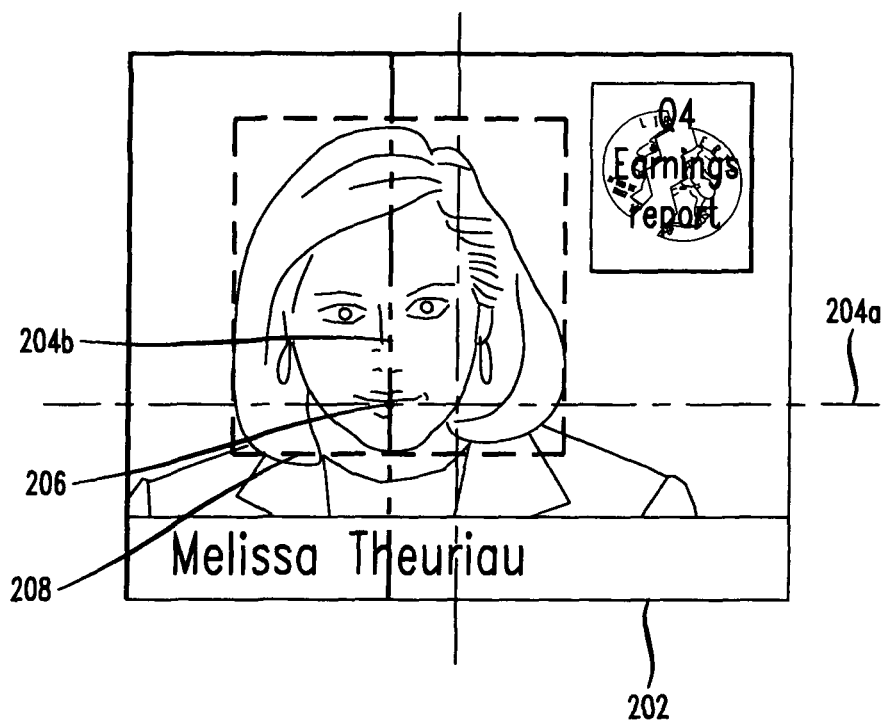
FIG. 3 depicts an enlarged portion of the of the GUI of FIG. 2 showing the manner in which an operator can manipulate a camera offset.

The GUI 200 advantageously enables an operator to set a tracking window (i.e., the border 208) as well as setting of x and y offsets (as defined the intersection 206 of the lines 204a and 204b in FIG. 2). In this way, the operator can maintain the object (the on-air talent 12 of FIG. 1) in a particular perspective, depending on graphics that appear in the same field of view as the on-air talent. For example, the graphics could appear over the right or left shoulder of the on-air talent 12 of FIG. 1, as indicated in the image depicted in the video screen 202 of FIG. 2, resulting in a "right OTS" or "left OTS" shot. Upon operator selection of the automatic tracking function following actuation of the auto track toggle button 218, the video screen 202 within the GUI 200 will display the image of the camera 16 of FIG. 1 with the current position of the offset. As described previously, the operator can make adjustments by touching the lines 204a and 204b and dragging them to the desired location. After saving the position of the lines 204a and 204b as a preset, the intersection 206 now becomes the x and y offset associated with that particular location preset. The camera 16 of FIG. 1 will track the object (e.g., the on-air talent 12 of FIG. 1) and re-adjust the position of the camera based on the difference between the stored offset and the location preset without operator intervention. FIG. 3 represents an enlarged view of the video screen 202 of FIG. 2 and more clearly depicts a tracking window having an "offset" from the center of the object in the field of view of the camera 16 of FIG. 1.

FIG. 4 depicts in flow chart form the steps of an exemplary process 400 by which the processor 20 of FIG. 1 can control the robotic camera assembly 14 of FIG. 1 to carry out automatic tracking of the on-air talent 12 of FIG. 1 in accordance with the present principles. The auto-tracking method 400 commences by first executing step 402 to create or re-set an object for tracking. Initial execution of step 400 serves to create an "empty" object. For tracking purposes, an object possesses certain characteristics, such as a shape and location as well as certain content-based characteristics, such as color and feature points for example. Initially, all of the object characteristics have zero values.

Execution of step 400 also serves to reset the position of the camera 16 of FIG. 1 in the x, y and z coordinate to locate the camera to a pre-defined (e.g., a pre-set) position. Similarly, the pan, tilt, zoom and iris are set to pre-defined values.

Following step 402, execution of step 404 occurs whereupon the processor 20 detects the object (e.g., the on-air talent 12 of FIG. 1) by comparing characteristics of the image (e.g., color feature points etc.) in a current video frame captured by camera 16 of FIG. 1 to a stored image of the object. Upon detecting the object (which occurs when the characteristics of the captured frame substantially matches the corresponding characteristics of the stored image), the processor 20 executes step 406 to determine stability of the object. Upon failing to detect the object, step 404 undergoes re-execution upon capture of the next video frame. In practice, step 404 will undergo re-execution to detect the object for a succession of captured video frames until reaching a time-out interval to avoid the execution of an endless loop. Although not shown in FIG. 2, an operator could intervene at this point to either continue object detection, or end the process.

Tracking of the object (i.e., displacement of the camera) generally requires that the object remain stable. In other words, the object should not undergo significant motion when attempting automatic tracking. Attempting automatic tracking while the object undergoes significant motion could result in movement of the camera 20 to a location from which the object has already moved, which could lead to the camera 16 of FIG. 1 "chasing" the object. To avoid such a possibility, the operator will typically select an interval during which the object must remain generally at the same position before the processor 20 will initiate movement of the camera 16 of FIG. 1. If the object generally substantially motionless for the specified interval, then the object remains stable for purposes of determining stability during step 406. The object stabilization step occurs because at the initial step the camera moves in open loop (i.e. no images are processed during this time). This initial displacement can take one second or more to reach the desired preset position (the zoom command is not that fast) and when the camera finally converges to this position the object that was still moving can be far away from this position leading to an object tracking failure or to a new very important camera displacement that is not the behavior desired.

If the processor 20 of FIG. 1 finds the object stable during step 406, then the processor displaces the camera 16 of FIG. 1 to the desired pre-set position, and likewise commands the lens 18 of FIG. 1 to zoom to a desired pre-set position during step 408. The operator can change these parameters using the preset modification ability available in the GUI 200 of FIG. 2. For each preset, the operator can modify the location of center of the captured image and image size. The operator can also change the preset using the preset selector of the GUI 200. During step 410, processor 20 updates the object characteristics and resets the object position counter used for stability determination purposes to zero. In particular, the processor 20 of FIG. 1 updates the object characteristics by establishing the position of the object in the current image. The object's characteristics include its shape, for example a rectangle or an ellipse). Using the shape information, the processor 20 extracts content-based characteristics for tracking the object. In the event of an inability to detect object stability during step 406, then process execution branches back to step 404.

Following step 410, the processor 20 of FIG. 1 executes step 412 to detect whether object tracking occurs with sufficient confidence. Object tracking occurs with sufficient confidence when the actual position of the object as detected from its characteristics lies with a given probability of its expected position, denoting the tracking confidence. An example of a tracking technique suitable for tracking objects is described infra. If the tracking confidence equals or exceeds a given threshold, the processor 20 of FIG. 1 assumes successful tracking and then proceeds to execute step 418 to test convergence. Otherwise, if the tracking confidence does not equal or exceed the threshold, then the processor 20 assumes the object to be lost.

Under such circumstances, process execution branches to step 414 to look for the object, using the position of the object in the previous frame as a reference position. The processor 20 looks for the object throughout the overall image, typically in a random manner by enlarging image sampling. A check then occurs during step 416 to determine whether the object has been found. To determine if it has found the object, the processor 20 checks whether the distance between the object characteristics and the object candidate characteristics remains lower than half of the tracking confidence. If so, then process execution branches back to step 412 to check for successful tracking. Otherwise, step 414 undergoes re-execution until the processor 20 of FIG. 1 locates the object. To avoid an endless loop, the process 400 could time out after a given interval in the absence of not finding the object. Note that the operator can change the tracking confidence in real time via the GUI 200 of FIG. 2.

Upon execution of step 418 of FIG. 4, the processor 20 of FIG. 1 determines convergence by determining if the position of the object corresponds to the desired pre-set position. At each instant in time, the object will have a convergence state, either TRUE or FALSE, depending on whether the distance between the actual position of the object and the desired pre-set position does not exceed a threshold value. Initially, the object has a FALSE convergent state. Upon detecting a FALSE convergent state, the processor 20 launches a test of convergence. If convergence state remains FALSE when checked during step 418, then step 420 undergoes execution, whereupon the processor 20 causes the camera 16 to move to a selected preset position. The processor 20 can separately control the pan and tilt speed, with the direction determined by using different values for pan and tilt speed. An operator can change the magnitude of the camera speed via the GUI 200 of FIG. 2.

To avoid the possibility of shaking caused by the camera 16 of FIG. 1 rapidly moving back and forth over a short distance during tracking, the processor 20 performs a tolerance check during step 422 following a determination during step 418 of a TRUE convergence state. During step 422, the processor 20 checks for tolerance by making use of a tolerance radius about each preset position. If the distance between the desired pre-set position and the current object position remains less than the tolerance radius, then no further movement of the camera 16 of FIG. 1 becomes necessary and the process ends at step 424. Otherwise, if the object (e.g., the on-air talent 12 of FIG. 1) lies outside the tolerance radius, then the processor 20 resets the convergence state to FALSE and step 420 undergoes re-execution to move the camera 16 to match object position and desired preset position.

An example of a tracking technique includes, e.g., a method of image processing adapted for tracking any general moving object marked by a user in a sequence of images. An example of such a method is randomized template tracking method. In the starting frame of the video sequence, a hand marked object or a detected object is identified. Then, in the same frame, a set of N template locations is drawn using, for example, a uniform number generation. A template of predefined maximum size is associated to each of these locations. The templates, $\{Ti\}_{i=1}^{i=N}$ are possibly trimmed in order that each of them lies within the marked object boundary. The following steps are then applied sequentially in the same order on every frame following the starting frame unless a tracking failure is signal.

Each template Ti is tracked in the current frame using for example a common normalized cross-correlation tracking method in a predefined search space. Such a method is further described in an article from J. P. Lewis entitled "Fast Template Matching" and published in Vision Interface in 1995 on p. 120-123. This method associates every template with a correlation surface. The grid location corresponding to the maximum of the correlation surface is the estimated new location of the template. Consequently a translation vector, denoted Vj, is derived for each template Tj in the set.

A subset of these templates is then possibly discarding in the current frame, i.e. outliers are removed from the set $\{Ti\}_{i=1}^{i=N}$. The step 12 is referred as rejection control step on FIG. 1. A robust clustering step is used to derive a first subset of set $\{Vi\}_{i=1}^{i=N}$. To this aim, each motion vector in the set $\{Vi\}_{i=1}^{i=N}$ compared with the remaining vectors using an Euclidean distance measure. A corresponding bin-count Bi is incremented for every vector that lies within a small predefined clustering radius r of this vector. All bin counts are set to 1 initially for all the templates. A subset $\{Vi\}_{i\in I}$, $|I|\leq N$ of the set $\{Vi\}_{i=1}^{i=N}$ formed by selecting all the motion vectors with associated bin-count Bi≥N/2. If N is odd the relationship is defined as Bi≥(N+1)/2. A second subset is then derived. To this aim, the two-dimensional mean of the first subset $\{Vi\}_{i\in I}$ and the resulting covariance matrix denoted as $\{\mu,\Sigma\}$ are computed. For computation sake, the cross variances are assumed to be zero. A Gaussian distribution g(V) is defined in motion space with these parameters. A weight wi=g(Vi) is assigned to each motion vector in the set $\{Vi\}_{i=1}^{i=N}$. The set $\{Ti,wi\}_{i=1}^{i=N}$ is then sorted in a descending order of weights. The weight of the element with index (N/2)−1, if N is even, or (N−1)/2, if N is odd is selected. This weight is denoted as C. Each template is then assigned a probability pi=min{1.0,W1/C}. Templates are finally discarded based on a threshold on this probability, i.e. templates with an assigned probability lower than a predefined threshold are discarded. At the end of this step, only M templates are retained. This subset is denoted $\{Ti\}_{i=1}^{i=M}$, where M≤N.

It is checked if the tracking is successful or not. The tracking is considered successful if at least N/2 (i.e. M>N/2), if N is even, or (N+1)/2 (i.e. M>(N+1)/2), if N is odd, templates are retained, and is considered failing otherwise.

If the tracking is successful, the correlation surfaces of the retained templates are combined into a probability distribution p(x) from which new templates are resampled to replenish the template set.

With $\{Ti\}_{i=1}^{i=M}$, the target state $x_T$ is estimated to be the mean of these template locations. The target state is the location of the target object on the image grid. The minimum bounding rectangle is also constructed, denoted Bmin, around these templates, which acts as the spatial bound for the state distribution computed below. Given $x_T$, the set of correlation surfaces associated with $\{Ti\}_{i=1}^{i=M}$ is translated to this location, sum and normalized, all within Bmin, to result in a probability distribution p(x). We consider p(x) as the distribution of target state $x_T$ generated by the randomized template tracking method. N−M template locations, denoted yk, are sampled from p(x) as follows:

$$y_k \sim p(x), 1\leq k \leq (N-M)$$

To each sampled location in the set $\{y_k\}$, Gaussian noise is added to increase sample diversity as shown below:

$$\hat{y}_k = y_k + \eta(0,\sigma^2)$$

Finally, to each sample location $y_k$ an image patch is associated around it as described below. In absence of a natural scale estimation scheme here, we are forced to remain conservative in choosing the dimensions of the new template. The chosen template is trimmed to fit αBmin, α≥1. The value α=1 is the most conservative estimate which we employ when tracking very small sized objects in aerial videos and the like. Here a must not be misconstrued to be a scale estimate of the tracked object.

If the tracking failed, all templates in the set $\{Ti\}_{i=1}^{i=N}$ are retained and their positions are extrapolated by the last successfully registered object translation, meaning the translation of the target state at the step in the past when tracking was signaled as successful. A target state $x_T$ is however estimated, at step 23, mainly for display purpose. In this case the target state $x_T$ is estimated to be the mean of the template locations after extrapolation. The control is then passed to when the next frame arrives. Such a scheme is found to be useful in handling very short occlusions of a few frames.

Probabilistic tracking methods are also known from the prior art. Some of them are based on particle filtering. An example of such a color model based particle filtering method is given in the document from P. Perez et al. entitled "Data fusion for visual tracking with particles" and published in Proc. IEEE, 92(3):495-513, 2004.

For example, initially, the particle positions denoted $\{xi\}_{i=1}^{i=K}$ in the current frame are predicted from the positions estimated in the past frame using for example random walk approach. A weight denoted $\pi_i$ is also computed for each particle position by matching the local histogram around the particle to the constant color histogram model of the target object stored in a memory from the first frame. This weight is higher if the location match the color model. The weights $\{\pi_i\}$ sum to unity. $\{\pi i, xi\}_{i=1}^{i=K}$ defines a probability distribution from which the target state xc, i.e. the location of the target object on the image grid.

A rejection probability is computed. This rejection probability is further used to make a binary decision for the color based tracking method. To this aim, the covariance matrix Cπ of the distribution $\{xi, 1/K\}_{i=1}^{i=K}$ are computed. Then the determinants of these covariance matrices are computed. From the property of determinants we know that this scalar quantity measures the effective volume of the parallelopiped constructed by the row vectors of the matrix. This motivates the use of this quantity as a scalar confidence measure to determine if the tracking is successful or not. With the above notations, the rejection probability pr is defined as follows:

$$pr = \min\left\{1.0, \frac{\det[C\pi]}{\det[CS]}\right\}$$

Pr tends to 1 as the uncertainty in the distribution increases and tends towards 0 as the distribution becomes more peaked. It is interesting to note that it can be inconsistent to analyze the performance of the filter based solely on evolution of its covariance over time. This is because the spread (covariance) of the samples at each tracking step is not constant and even with resampling there is bound to be some fluctuations. Therefore, it is necessary to account for this variable spread via a factor like Cs.

The tracking is considered successful if pr is less than an empirical threshold and is considered failing otherwise.

If the tracking is successful, the filtering distribution is resampled and the target state xc is estimated to be the mean of the distribution estimated.

If the tracking failed, the resampling of the filtering distribution is stopped. This causes the samples to be more and more spread at each tracking step. In the absence of clutter, the sample weights tend to be uniform which results in the probability pr tending to 1. But once a subset of the samples gains distinctly more weight (say in a relock scenario after a few frames of occlusion) a few frames later, the rejection probability pr tends towards 0 leading to a success signal. In this case; the target state $x_T$ is estimated to be the mean of the filtering distribution.

The particle filtering recommences when the next frame arrives.

Image processing adapted for tracking an object in a sequence of images may comprise the following steps applied on each image of the sequence:

determining the location of N templates in the current image on the basis of locations of the N templates in a preceding image, with N an integer, the step being called first tracking step;

determining, according to a first predefined criteria, if the first tracking step is successful or is not successful; and determining a probability distribution, called first probability distribution, representing the probability distribution of the object location in the current image. The method further comprises the following steps:

determining the location of K particles in the current image on the basis of locations of the K particles in the preceding image, with K an integer, and assigning each particle a weight representing the level of match between an observation made for the particle in the current image and a predefined model, the K particles' locations and associated weights defining a second probability distribution, the step being called second tracking step;

determining, according to a second predefined criteria, if the second tracking step is successful or is not successful;

if the first tracking step is not successful and the second tracking step is successful:

determining the location of N new templates in the current image based on the second probability distribution;

replacing the N templates in the current image with the N new templates;

determining the location of the object in the current image based on the second probability distribution; and if the first tracking step is successful and the second tracking is not successful:—determining the location of K new particles in the current image based on the first probability distribution;

replacing the K particles in the current image with the K new particles and assigning each particle a same predefined weight;

determining the location of the object in the current image based on the first probability distribution; and if both first and second tracking steps are successful or if both first and second tracking steps are not successful determining the location of the object in the current image on the basis of the first probability distribution or on the basis of the second probability distribution.

The predefined model may be a color histogram of the object and the observation may be a color histogram computed in a patch centered on the particle location and the predefined weight equals 1 divided by K.

The first tracking step may comprise:

determining, for each template of the preceding image, an image area in the current image, called correlation surface, whose correlation with a previously defined correlation surface centered on the template is maximum; and determining the template positions in the current image as the centers of the correlation surfaces in the current image.

The method may further comprise a step for assigning a priority level to the first tracking step and to the second tracking step, and:

if the priority level of the first tracking step is higher than the priority level to the second tracking step, then:

if the first tracking step is not successful and the second tracking step is successful, switching the priority levels between the first tracking step and the second tracking step;

if the first tracking step is successful and the second tracking is not successful, leaving the priority levels unchanged;

if both first and second tracking steps are successful or if both first and second tracking steps are not successful determining the location of the object in the current image on the basis of the first probability distribution and leaving the priority levels unchanged; and if the priority level of the first tracking step is lower than the priority level to the second tracking step, then:

if the first tracking step is not successful and the second tracking step is successful, leaving the priority levels unchanged;

if the first tracking step is successful and the second tracking is not successful, switching the priority levels between the first tracking step and the second tracking step;

if both first and second tracking steps are successful or if both first and second tracking steps are not successful determining the location of the object in the current image on the basis of the second probability distribution.

A tracking method may combine two known tracking methods. As an example, the two tracking methods described may be used. However, any other tracking method may be used provided that one of them relies on an adaptive set/catalogue model of the object and the other relies on a constant holistic model like a color histogram of the object. In the following, the two methods are referred as method T and method C, where T stands for template tracking and C for color based tracking. The method C may be replaced by any particle filtering based tracking method, i.e. not necessarily color based.

At the initialization stage of tracking, a priority denoted P is assigned to one of the two tracking methods. This priority P is then switched between the two methods depending on their current signs of success or failure of the methods at each tracking step. Furthermore, at each instant the method that has the priority makes an estimation of the target state denoted X.

Both methods are run independently without any interaction or information exchange except possibly at the very end. Therefore, both methods may run in parallel.

As a first example, it is assumed that at the initialization stage method T has been given the priority, i.e. P=T.

if T is successful, the target state X is made from T;

otherwise (i.e. if T failed) it is checked if C is successful:

if C is successful, the cross sampling described below applies, P is set to C and the target state X is made from C;

otherwise (i.e. if C failed), resampling is interrupted and the target state is made from T.

if C is successful target state is estimated from the T side, (if T is also successful) or from the C side (if T failed); otherwise:

if T also failed, resampling is interrupted at step 34 but target state is made from T since P=T;

Otherwise, cross-sampling applies, and the target state is estimated from T.

As a second example, it is assumed that at the initialization stage method C has been given the priority, i.e. P=C.

if C is successful, the target state X is made from C;

otherwise (i.e. if C failed) it is checked if T is successful:

if T is successful, the cross sampling step 38 described below applies, P is set to T and the target state X is made from T;

otherwise (i.e. if T failed), resampling is interrupted and the target state is made from C;

It should be understood that even if P=C:
if T is successful target state is estimated from the C side, either (if C is also successful) or from the T side (if C failed);
otherwise: if C also failed, resampling is interrupted, but target state is made from C since P=C,
Otherwise, cross-sampling applies, and the target state is estimated from C.

At cross-sampling steps both tracking methods interact and exchange information in only one direction, i.e. the successful tracking method provides information in the form of a probability distribution of locations of the target object to the other tracking method. There are two types of cross sampling. Both steps are further detailed below.

If P=T and method T is successful, then the state estimate as stated earlier is made from method T. If at some later instant method T fails but method C is successful, possibly when there is partial occlusion and/or jerky out of the image plane rotation. The target state is now estimated from method C, the priority switched to method C and the following cross sampling applies. The entire template set $\{Ti\}_{i=1}^{i=N}$ is discarded, i.e. are erased from memory, and a new set of N template locations are sampled from the color filtering distribution (i.e. $\{\pi i, xi\}_{i=1}^{i=K}$) at the corresponding instant and each location assigned an image template, e.g. a rectangle of a predefined size. The templates are then trimmed, if necessary, to fit the bounds of the object as decided by method C. Therefore, the trimming step may change the size of each template. It is also to be noticed that the past object model composed by the templates is totally discarded and updated at the current instant from the color distribution. The step gives the template tracking method on the whole a new set/catalogue model of the target object.

If P=C and method C is successful, then the state estimate as stated earlier is made from method C. Now say at some later instant method C fails but method T is successful, typically when there are extreme illumination changes and/or nearby clutter. The state estimate is now made from the method T, the priority switched to method T and the following cross sampling applies. The current samples $\{\pi i, xi\}_{i=1}^{i=K}$ which compose the filtering distribution are discarded, i.e. erased from memory, and replaced by new samples drawn from the target state distribution p(x) defined by the combination of correlation surfaces output by method T. Each sample is weighted equally (i.e. the new weights are all set to 1/K to result in the distribution given as $(\{/10/k, xi\}_{i=1}^{i=K})$. The color model, i.e. color histogram, is however not updated. The constant color model of the target object derived from the first frame is stored in a memory and is never updated.

If both methods T and C failed at the same tracking stage (i.e. on the same image), then the resampling step in both tracking method are interrupted. In this case we resort to both interrupting resampling. This case may occur in a complete occlusion scenario where the occluding object shares no commonality with the target reference model.

According to another embodiment, no priority is set, but T is the main tracking method and C is used to update its state distribution especially when T failed and C is successful. This solution is equivalent to set P=T and to never update P.

In a third embodiment, no priority is set, but C is the main tracking method and T is used to update its state distribution especially when C failed and T is successful. This solution is equivalent to set P=C and to never update P.

The target model which is employed in the method according to the invention is a multi-part model. Advantageously, the method of the invention does not require a single fused target state distribution but uses instead two target state distributions: one coming from the template tracking method and the other one coming from the color based particle filtering method. The first part is composed of the gray level templates. Due to the sequential resampling procedure, at any tracking instant, the age of each element in the template set is possibly different from the rest. Therefore, this set consists of templates having lifespans of a few to several tens of frames and thus plays the role of the dynamically adapted part of the entire target model. The second part of the model is the constant color histogram of the target object. This is the static part of the two part target appearance model and does not interact with the first part. The histogram is deliberately kept constant to avoid false adaptation due to illumination, orientation and size changes.

The foregoing describes a technique for automatically tracking an object.

The invention claimed is:

1. A method for determining when to track an object in field of view of a robotically controlled camera, comprising:
   receiving an operator defined region of interest inside of the field of view of the camera, wherein no tracking will occur outside of the region of interest;
   when the object lies within the region of interest, determining if the object matches a reference object; and
   determining to automatically track the object to maintain the object in a fixed relationship relative to a location in the camera field of view when it is determined that the object lying within the region of interest matches a reference object, and when the object has moved more than a threshold distance from the location.

2. The method according to claim 1, wherein determining a match between the object and reference object includes:
   comparing at least one characteristic of the object to at least one corresponding characteristic of the reference object.

3. The method according to claim 1, further including:
   displacing the camera to a pre-set position when the camera pre-set position and location of the object do not lie within a threshold distance from each other.

4. The method according to claim 3 further comprising:
   ceasing camera movement when the camera pre-set position lies within a tolerance radius of the actual object position.

5. The method according to claim 1, further comprising:
   determining if the image remains stable for a selected interval; and
   determining to automatically track the object when both that the object lying within the region of interest matches a reference object and when the image of the object has remained stable for the selected interval.

6. The method according to claim 5, wherein determining whether the object remains stable further comprises:
   detecting whether the object has moved during a prescribed interval.

7. The method according to claim 1, further comprising:
   wherein the threshold distance is set by receiving at least one offset from a center position of the object;
   maintaining the object in a particular perspective based on the received offsets.

8. The method according to claim 7, further comprising:
   receiving a modification of the at least one offset.

9. The method according to claim 8, wherein the offset is received via dragging a representative line on a screen to adjust the offset.

10. The method according to claim 1, further comprising maintaining the object in a position offset from the center of the camera.

11. An apparatus for determining when to track an object comprising:
a processor configured to:
receive an operator defined region of interest inside of the field of view of the camera, wherein no tracking will occur outside of the region of interest;
when the object lies within the region of interest, determine if the object lying within the region of interest matches a reference object;
detect if the object has moved more than a threshold distance from the pre-set location; and
determine to automatically track the object when the object lying in the region of interest is determined to match the reference object, to maintain the object in a fixed relationship relative to a pre-set location in the camera field of view if the object has moved more than a threshold distance from the pre-set location.

12. The apparatus according to claim 11, wherein the processor is further configured to determine the match between the object and the reference object by comparing at least one characteristic of the object to at least one corresponding characteristic of the reference object.

13. The apparatus according to claim 11, wherein the processor is further configured to:
determine whether the object remains stable for a selected interval; and
determine to automatically track the object when both the object lying in the region of interest is determined to match the reference object and when the image is determined to remain stable for the selected interval, wherein determining whether the object remains stable further comprises detecting whether the object has moved during a prescribed interval.

14. The apparatus according to claim 11, wherein the processor is further configured to control a robotic camera pedestal to displace the camera to a pre-set position when the camera pre-set position and location of the object do not lie within a threshold distance from each other.

15. The apparatus according to claim 14, wherein the processor is further configured to cease camera movement when the camera pre-set position lies within a tolerance radius of the actual object position.

16. An apparatus for determining when to track an object comprising:
a camera for acquiring an image of the object;
a robotic camera pedestal; and
a processor for controlling the robotic camera pedestal in accordance with the camera image by:
receiving an operator defined region of interest inside of the field of view of the camera, wherein no tracking will occur outside of the region of interest,
when the object lies within the region of interest, determining if the object lying within the region of interest matches a reference object, and
determining to displace the camera to track the image when it is determined that the object lying within the region of interest matches a reference object and when the object is determined to have moved more than a threshold distance from the pre-set location.

17. The apparatus according to claim 16, wherein the processor is further configured to determine the match between the object and the reference object by comparing at least one characteristic of the object to at least one corresponding characteristic of the reference object.

18. The apparatus according to claim 16, wherein the processor is further configured to determine whether the object has remained stable during a prescribed interval, and determine:
to track the object only when the object has remained stable for the prescribed interval.

19. The apparatus according to claim 16, wherein the displacement of the camera includes displacing the camera to a pre-set position when the camera pre-set position and location of the object do not lie within a threshold distance from each other.

20. The apparatus according to claim 19, wherein the processor is further configured to cease camera movement when the camera pre-set position lies within a tolerance radius of the actual object position.

* * * * *